March 8, 1966   R. H. KOEHLER   3,238,566
APPARATUS FOR SEALING IN PLASTIC FORMING MACHINES
Filed Sept. 28, 1964

INVENTOR.
Ralph H. Koehler
BY
Frank C. Karman.
ATTORNEY

United States Patent Office 3,238,566
Patented Mar. 8, 1966

3,238,566
APPARATUS FOR SEALING IN PLASTIC
FORMING MACHINES
Ralph H. Koehler, Saginaw, Mich., assignor to Resistance Welder Corporation, Bay City, Mich., a corporation of Michigan
Filed Sept. 28, 1964, Ser. No. 399,789
8 Claims. (Cl. 18—19)

This invention relates to air seals for sealing plastic sheet material of varying thicknesses in a mold, so that the product manufactured from said plastic material may be formed by high pressure without leakage.

One of the prime objects of the invention is to provide a seal of sufficient flexibility to fit a wide variety of contours and which is sufficiently rigid to resist extrusion in space caused by variations in material thicknesses and machine deflection when in operation.

Another object of the invention is to provide retainer means engageable with said sealing means for holding the sealing means in proper position in the machine, the shape and design permitting the air molding pressure to maintain the seal during normal machine deflection and accommodate various material thicknesses without other machine adjustments.

A further object is to provide a sealing means of maximum sealing capacity permitting high forming pressures to be used without leakage.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

Figure 3:
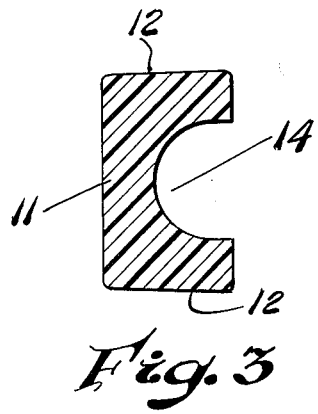
FIG. 3 is an enlarged, transverse, sectional view through the seal.

Referring now more particularly to the drawing in which I have shown the preferred embodiment of my invention and in which the numeral 8 indicates the lower platen of a container forming machine in which a plurality of mold openings 9 are provided as usual. A continuous groove 10 is provided in the face of the lower platen 8 directly adjacent the outer edge thereof, said groove 10 following the contour of the mold assembly and the seal 11 is mounted therein, said seal comprising a strip of suitable pliable material which is unaffected by the necessary elevated temperatures, the top and bottom face of said strip being angled as at 12, with a centrally disposed passage 14 provided in the inner face thereof as clearly shown in FIG. 3 of the drawing.

Figure 1:
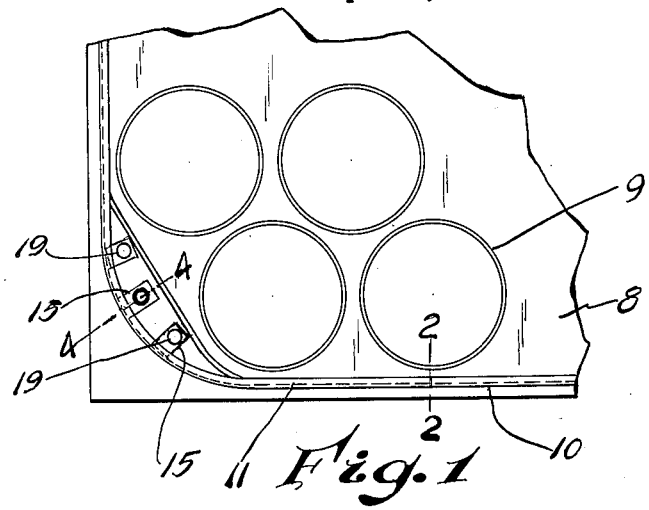
FIG. 1 is a fragmentary, plan view of a machine used for forming plastic containers showing the sealing means in position thereon.
Figure 2:
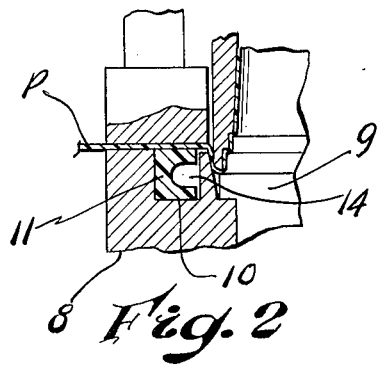
FIG. 2 is a fragmentary, sectional side elevational view with the upper platen in position.

The height of the seal 11 in its unflexed condition, is greater than the depth of the groove in which it is mounted, and in practice, the edges of the plastic sheet P lie thereon so that when the lower platen moves upwardly to clamp the seal between the lower platen and plastic sheet, and the upper platen, the seal is compressed to shape as clearly shown in FIG. 2 of the drawing, making a tight seal around the entire edge of the sheet, said seal having sufficient flexibility to accommodate various material thicknesses and platen surface variations without other machine adjustments or normal machine deflection due to air forming pressures, further permitting higher forming pressures to be used and insuring a clean, sharply formed, uniform product formed to required shape and dimensions.

Figure 5:
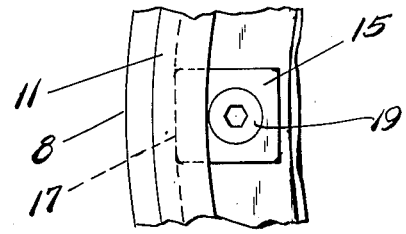
FIG. 5 is a fragmentary, plan view with the upper platen removed.
Figure 4:
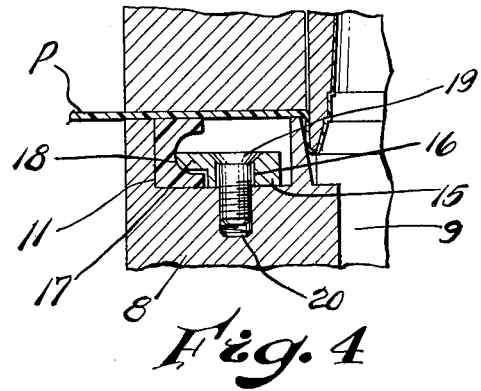
FIG. 4 is a transverse, sectional view taken on the line 4—4 of FIG. 1, showing a retainer means for holding the seal in position.

In FIGURES 4 and 5, I have shown a retainer means for holding the seal member 11 upright and in proper operating relation when the seal groove leads around curves and corners, said retainer comprising a plate 15 formed with openings 16 therein as shown, said plate having a projecting shouldered section 17, the outer edge of which is curved as at 18 to bear in the passage 14 provided in the one face of the seal to hold said seal in proper upright position.

The retainer is secured in position on the lower platen by means of a screw 19 threaded into an opening 20, and when the screw is turned to set position, the seal will be held upright and tight, air bleeds into the passage 14 to eliminate vacuum and maintain normal expansion and contraction of the seal when pressures are applied, so that all walls of the seal are freely flexible. The nature of the seal material is such that it is sufficiently flexible to fit a wide variety of contours, and also sufficiently rigid to resist extrusion in space caused by material thicknesses and machine deflection.

From the foregoing description, it will be obvious that I have perfected a very simple, practical, and relatively inexpensive seal for plastic forming machines of all kinds.

What I claim is:

1. A seal for sealing a space between two members having a sheet of plastic material interposed therebetween when one of said members is moved into engagement with the sheet; a continuous, seal receiving groove around the outer edge of one of said members; a continuous, yieldable sealing member mounted in said groove; said sealing member being formed with an upwardly angled flat surface which projects above the upper edge of said groove, and a centrally disposed, continuous passage provided in one side wall of said sealing member.

2. The combination defined in claim 1 in which the seal is maintained between the said two members and the plastic sheet during the period there is an increase in the space between said members due to machine deflection.

3. A combination as set forth in claim 1 in which retaining means is mounted in one of said members adjacent the sealing member, said retaining means being engageable with the passage in the seal to hold it in set position.

4. The combination defined in claim 1 in which said seal member is formed of a silastic rubber compound.

5. The combination set forth in claim 1 in which the plastic sheet is heated to a temperature as high as 300° F.

6. A seal for sealing the space between two members having a sheet of plastic material interposed therebetween when the space between said members is increased and varied due to machine deflection; a continuous seal receiving groove around the outer edge of at least one of said members; a continuous yieldable sealing member mounted in said groove; said sealing member being formed with a pitched flat upper surface projecting above the upper edge of said groove; and a centrally disposed, continuous passage provided in at least one side wall of said sealing member.

7. The combination defined in claim 6 in which retainers are mounted in said groove for engagement with said sealing member to hold said sealing member in upright position on curves in the grooves.

8. The combination set forth in claim 1 in which the seal is maintained between the two members and the plastic sheet during the period there is an increase in the space between said members due to thinner plastic material being used.

References Cited by the Examiner

UNITED STATES PATENTS 2,702,411  2/1955  Winstead _____ 18—19 XR
2,772,012  11/1956  Crabtree.
3,182,482  5/1965  Moller _____ 18—19 XR

FOREIGN PATENTS 1,142,339  9/1957  France.

WILLIAM J. STEPHENSON, *Primary Examiner.*